(12) United States Patent  (10) Patent No.: US 7,716,687 B2
Bales et al.  (45) Date of Patent: May 11, 2010

(54) SYSTEM AND METHOD FOR SHARING RESOURCES BETWEEN WEB APPLICATIONS

(75) Inventors: Christopher E. Bales, Boulder, CO (US); Charles Coates, Erie, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 1319 days.

(21) Appl. No.: 11/170,396

(22) Filed: Jun. 29, 2005

(65) Prior Publication Data

US 2007/0006089 A1  Jan. 4, 2007

(51) Int. Cl.
*G06F 13/00* (2006.01)
(52) U.S. Cl. ........................................ 719/329; 715/769
(58) Field of Classification Search ................. 719/329; 715/769
See application file for complete search history.

(56) References Cited

U.S. PATENT DOCUMENTS 7,376,900 B2 * 5/2008 Guido et al. ................ 715/742
2006/0212822 A1 * 9/2006 Facemire et al. ............ 715/769
2006/0225094 A1 * 10/2006 Facemire et al. ............ 725/45
2006/0230059 A1 * 10/2006 Etgen et al. ............. 707/103 R
2008/0133510 A1 * 6/2008 Timmons ...................... 707/5

* cited by examiner

*Primary Examiner*—Andy Ho
(74) *Attorney, Agent, or Firm*—Fliesler Meyer LLP

(57) ABSTRACT

Embodiments of the present invention enable an interface for sharing resources between applications. An indicator can be used to identify resources that are selectable. Additionally, indicators can identify locations of the page that can accept resources and a function to be performed when a resource is dragged into a section of a page corresponding to a web application. By utilizing, these functions, an interface is created that allows a user to select a graphical representation of a resource in a first application and cause the resource to be associated with a second application by dragging the graphical representation of the resource to the second application or otherwise selecting the second application.

17 Claims, 6 Drawing Sheets

SYSTEM AND METHOD FOR SHARING RESOURCES BETWEEN WEB APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 11/170,396 entitled SYSTEM AND METHOD FOR SHARING RESOURCES BETWEEN WEB APPLICATIONS, by Christopher Bales et., filed on Jun. 29 2005, and U.S. patent application Ser. No. 11/170,298 entitled SYSTEM AND METHOD FOR PROVIDING COLLABORATION RESOURCES BETWEEN WEB APPLICATIONS, by Christopher Bales et al., filed on Jun. 29, 2005.

FIELD OF THE INVENTION

The present invention relates broadly to the use of web applications. More particularly, it relates to methods for providing collaboration resources between web applications in a web portal.

BACKGROUND OF THE INVENTION

Historically, web portals, which are centralized web locations that provide access to content and applications, have served the needs of end users accessing a remote site that provides them with content. Additionally, the applications provided have been relatively straightforward informational applications such as stock tickers, weather information feeds or search windows. Over the past three to four years, web portals have been utilized for more complicated tasks, and have begun to integrate the types of functionality that has historically been associated with local desktop applications. In order to address these new usage scenarios for portals, developers have sought to provide portals that can easily be accessed by multiple users. Some environments enable users to develop custom desktops or homepages providing access to multiple applications.

However, the interoperability between these applications is often limited, making it difficult for a user to utilize content or resources associated with one application in another application. Often resources must be saved to a central file system in one application and then accessed separately from another application, without any easy means for moving or copying the resources.

What is needed are improved methods and mechanisms for sharing resources between applications in a web portal environment to enable portals to provide collaborative applications that could be utilized by multiple users.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

The present application discloses systems, methods, and computer readable media for sharing applications between web applications. According to embodiments of the present invention, multiple web applications are presented on a web page or other location accessible through a HyperText Markup Language (HTML) interface. In some embodiments, the applications are portlets. As used herein, the term "portlet" refers to an application which is used to present dynamic or static content on a web page. The content and interface provided by the portlet can occupy a predetermined section of a page.

Embodiments of the present invention enable an interface for sharing resources between the applications. An indicator can be used to identify resources that are selectable. Additionally, indicators can identify locations of the page that can accept resources and a function to be performed when a resource is dragged into a section of a page corresponding to a web application. By utilizing these identifiers, a user interface is created that allows a user to select a graphical representation of a resource in a first application and cause the resource to be associated with a second application by dragging the graphical representation of the resource to the second application or otherwise selecting the second application.

Figure 1:
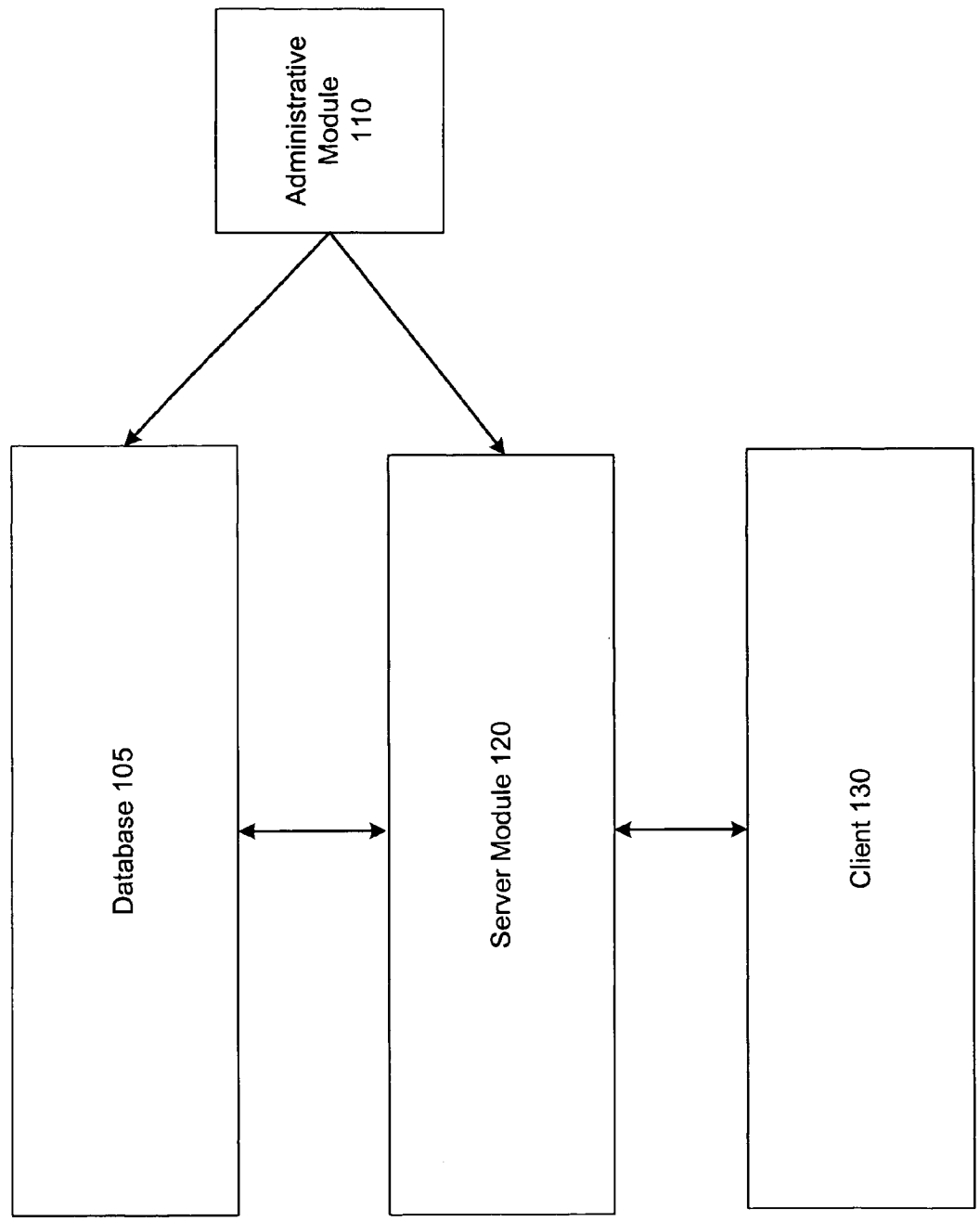
FIG. 1 is a block diagram illustrating one embodiment of interaction between multiple systems for creating and accessing applications.

FIG. 1 is a block diagram illustrating one embodiment of interaction between multiple systems for creating and accessing applications. The system includes an administrative module 110, one or more databases 105, a server module 120, and a client 130. The administrative module 110, database 105, server module 120, and client 130 can be connected through one or more networks. The networks can include but are not limited to: public and/or private networks, wireless networks, optical networks, and satellite based communication links. Other suitable communication means can include but are not limited to: random access memory, file system(s), distributed objects, persistent storage, and inter-processor communication networks. The server module 120 is a server that supports a web portal and various applications, which may written using Java™ or another programming language suited for use with web portals. (Java™ is a trademark of Sun Microsystems, Inc.). In one embodiment, the server module 120 utilizes WebLogic® Server, available from BEA Systems. The one or more databases 105 can include but are not limited to: relational databases, object-oriented databases, file systems, or any other kind of persistent storage. In one embodiment, the databases store portal content that is manipulated through the administrative module 110 and accessed by the server module 120 during its operation. The administrative module 110 is an interface which can be remote or local to the server module 120 that is used to configure, modify, and extend the server module 120.

The client 130 is a system that is used to access user information provided by the server module 120. The client 130 can be a thin client or a fully functional system having its own processing and storage. The client typically includes a web browser for accessing content maintained by the server. It should be understood that though these systems are presented as logically separate, that they can be grouped together as any number of systems.

Figure 2:
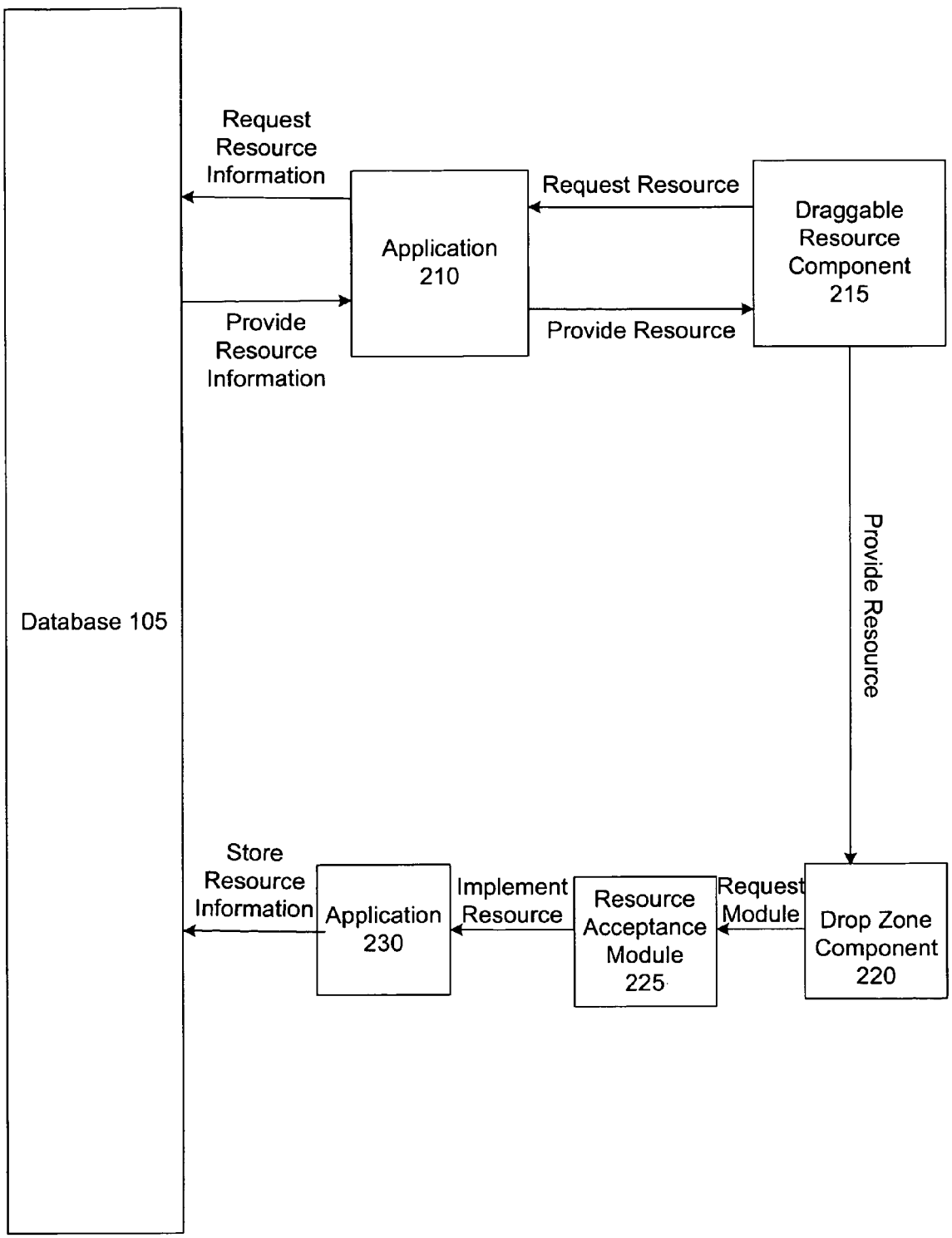
FIG. 2 is a block diagram illustrating one embodiment of an architecture for transferring resources between applications.

FIG. 2 is a block diagram illustrating a view of one embodiment of an architecture for transferring resources between applications. The components illustrated herein can appear on either the client 130 or server module 120. The resources can include documents, images, movies, sounds, music, streaming media, voice communications, user data, or any other type of information that can be associated with one of the applications. Transfer of a resource causes a resource to be associated with a new application, triggering a new function within the application. In the present embodiment, two applications, 210, 230, are configured to be presented on a web page and are associated with the database 105. A draggable resource component 215 and drop zone component 215 enable resources associated with the first application 210 to be shared with the second application 230 in response to a selection of the resource and the second application. A resource acceptance module 225 determines the effect of the association on the second application 230.

In one embodiment, the applications 210, 230 are portlets presented on a web page, though in other embodiments different mechanisms can be used to present the applications. A portlet is a self-contained application that is responsible for rendering its own content on a page. By way of a non-limiting example, a portlet might be a display of current news headlines, wherein if a user selects a headline the portlet retrieves and the underlying story and displays it for the user. Portlets can communicate with other portlets and with back-end processes such as legacy software, databases, content management systems, enterprise business services, etc. In addition, multiple instances of a portlet can execute simultaneously.

The draggable resource component 215 is configured to enable resources associated with the first application 210 to be selected and passed to other applications. The drop zone component 220 is configured to enable the second application to accept resource association actions. The draggable resource component 215 includes a configuration indicating how the resource should be presented during a drag operation. In one embodiment the draggable resource includes a configuration file referencing an image to represent the selectable resource. In one embodiment, the draggable resource component 215 and drop zone component 220 are generated from a Java Sever Page (JSP) on the server when the page displaying the applications 210, 230 is loaded. In alternate embodiments, the components 215, 220 can be generated through some other mechanism or be located on the server 120.

The drop zone component 220 and draggable resource component 215 can be generated from JSP tags indicating how the components should be presented and respond to user selections. For example, enclosed is one embodiment of a draggable resource tag that could be processed on the server to generate a web page having draggable resources:

```
<dragdrop:draggableResource imageId="testImage"
resourceId="${item.id}" resourceName="${item.name}">
    <img id="testImage" src="images/generic.gif" width="20"
height="22" border="0">
        <netui:anchor action="displayDetails">
            <netui:parameter name="issuesDetailsId" value="${id}"/>
            <b><c:out value="${item.name}"/></b>
        </netui:anchor>
</dragdrop:draggableResource>
```

The draggable resource tag above includes the following parameters:
  imageId: This parameter indicates the identity of an HTML image tag somewhere on the page. This will indicate which image will be represented under the cursor when the dragging occurs.
  resourceId: This is an identifier that identifies the dragged resource.
  resourceName: This is the name of the dragged resource.
Regarding the drop zone component, it can also be generated from a JSP tag. Enclosed is one example of a JSP tag that could be stored in a JSP for the purposes of generating a drop zone in a page.

```
<dragdrop:resourceDropZone targetId="createNewDiscussion"
pageFlowAction="testAction">
    <netui:anchor action="createContent">Create New
Discussion</netui:anchor><br>
</dragdrop:resourceDropZone>
```

The drop zone tag includes the following parameters:
  targetId: This is an identifier that identifies the target on which the resource was dropped.
  jsFunctionCall: This is the complete JavaScript function call that will be executed when the resource is dropped.
  formAction: This identifies the action of the form that will be posted when the resource is dropped. This can be any valid action that can be placed in a standard HTML form tag.
  pageFlowAction: This is the name of a Page Flow action that can be executed when the resource is dropped.

The resource acceptance module 225 is a function that is executed with respect to the application 230 when the resource is dropped on the application. In one embodiment, this is the form action, pageflow action, or Javascript function that is specified in the tag. The resource acceptance module 225 can be used to integrate the resource into the application in any number of ways. For example, if the second application 230 were a discussion application and the resource were a document, the resource acceptance module 225 could be a function that causes a new topic for the resource to be generated in the discussion application.

When a resource is moved from the first application 210 to the second application 230, the draggable resource component 215 first requests the resource from the application 210. The application 210 then requests the information associated with the resource from the database 105 and provides the resource to the draggable resource component 215.

The draggable resource component 215 then provides the resource to the drop zone component 220. In some embodiments, the draggable resource component 215 and drop zone component are part of a single interface component on the client 130. Acceptance of the resource by the drop zone component 220 causes the resource acceptance module 225 to implement the resource on the second application 230. Often this implementation is particular to the functionality of the application 230. For example, if the application 230 was an electronic mail client, the implementation could entail generating a new electronic mail message with the resource as an attachment. Once the resource is associated, the second application 230 can create an entry for the resource in the database 105 that is associated with the second application 230.

Figure 3:
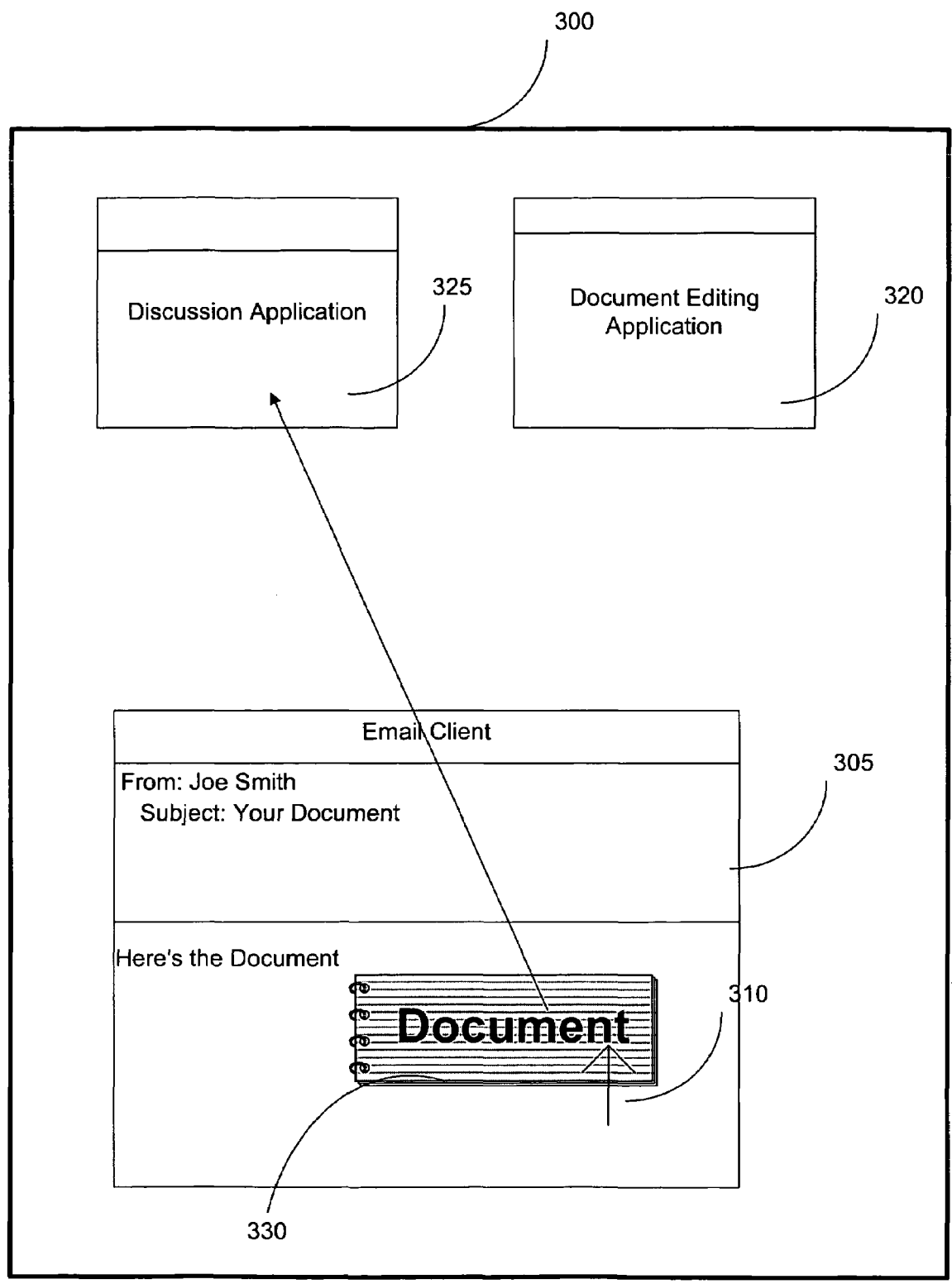
FIG. 3 illustrates one embodiment of graphical user interface for sharing resources between applications through the use of selectable graphical icons.

FIG. 3 illustrates one embodiment of a graphical user interface 300 for sharing resources between applications through the use of selectable graphical icons. In one embodiment, this interface is presented on a page on the client 130. Three applications 305, 320, 325 are presented in the interface. In some embodiments, the applications 305, 320, 325 are portlets. In the present embodiment the applications are a discussion application 325, a document editing application 320 and an email client 305. The discussion application can be a live chat application or one in which static postings are submitted. The document editing application 320 can be an application that provides basic word processing functionality.

In the present embodiment, the interface 300 is manipulated through selections of the presented elements. By way of a non-limiting example, in one type of user interface, a graphical user interface (GUI), a selection of a GUI element can be accomplished with an input device such as a mouse, a motion detector, voice commands, hand or eye gestures, etc. In the present embodiment a pointing indicator 310 is used to make selections.

In the present embodiment, a document 330 received in an email message is presented in a window of the email client 305. In the present embodiment, each of the applications can be associated with a drop zone component and a draggable resource component as per FIG. 2. The utilization of these components can enable resources associated with one of the applications to be associated with a different application.

A selection of the document 330 with the pointing indicator 310 followed by a selection of the discussion application 325 can trigger a resource association module to associate the document 310 with the discussion application 325. In one embodiment, these selections can be achieved through the use of a "drag and drop" operation that moves the document 310 over the discussion application.

Upon selecting the document, configuration information associated with the draggable resource component of the email client 305 would be utilized to determine how the document 330 is presented during the drag and drop operation. When the document 330 is moved to the discussion application 325, a drop zone component associated with the discussion application utilizes a resource acceptance module to accept the document 310 and associate the document 310 with the discussion application 325. The association process entails generating some manner of action within the discussion application for the application. For example, the resource acceptance module for the discussion application 325 could cause a discussion thread for the document 310 to be opened. Alternatively, if the document were being associated with the document editing application 320 a resource acceptance module for the document editing application 320 could cause the document 310 to be opened in the document editing application 320.

The resource acceptance functions can be implemented through javascript, a pageflow function, a form submission function, or through any other mechanism on either the server 120 or client 130.

Figure 4:
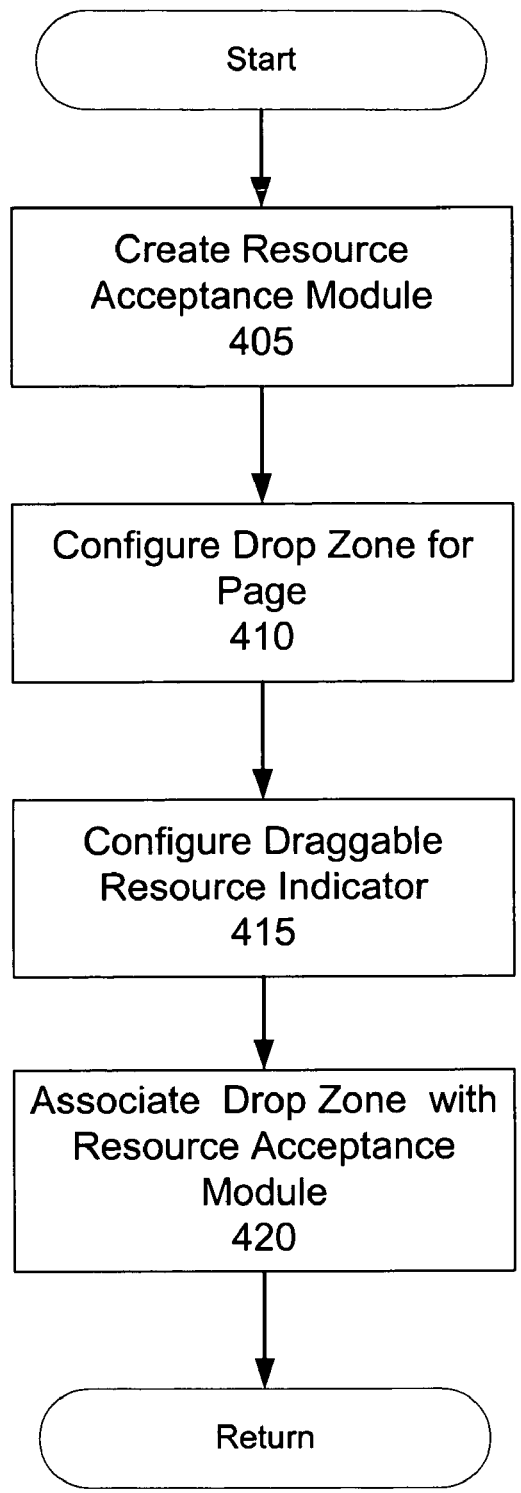
FIG. 4 is a flow chart illustrating one embodiment of a process for configuring applications to share resources.

FIG. 4 is a flow chart illustrating one embodiment of a process for configuring applications to share resources. In one embodiment, this process can be performed by the administrative module 110. In alternate embodiments, other systems can be used. In block (405) a resource acceptance module is created. The resource acceptance module determines a function performed on a destination application when a resource is associated. The resource acceptance module can be a pageflow action, a javascript function, a java function or any other mechanism for affecting the application.

In block (410) the drop zone is configured for the page. Configuring the drop zone can entail designating a section of the page to which a resource can be dragged to create an association between a destination application and the resource. The drop zones can be located anywhere but are usually configured near or upon the visual representation of the application itself.

In block (415) the draggable resource indicator is configured. Configuring the draggable resource indicator can entail designating a section of the page on which the resource can be accessed by selecting the section. Also, configuring the draggable resource indicator can entail designating an image to represent the resource both statically and while the resource is being moved to the drop zone.

In block (420) the drop zone is associated with the resource acceptance module. In some embodiments, associating the drop zone with the resource acceptance module entails modifying a configuration file. In alternate embodiments, associating the drop zone with the resource acceptance module entails referencing the resource acceptance module in a JSP tag for the page displaying the applications. Once the association is complete, the page processed by the server and rendered on the client, will utilize the resource acceptance module to associate the resource with the destination application.

Figure 5:
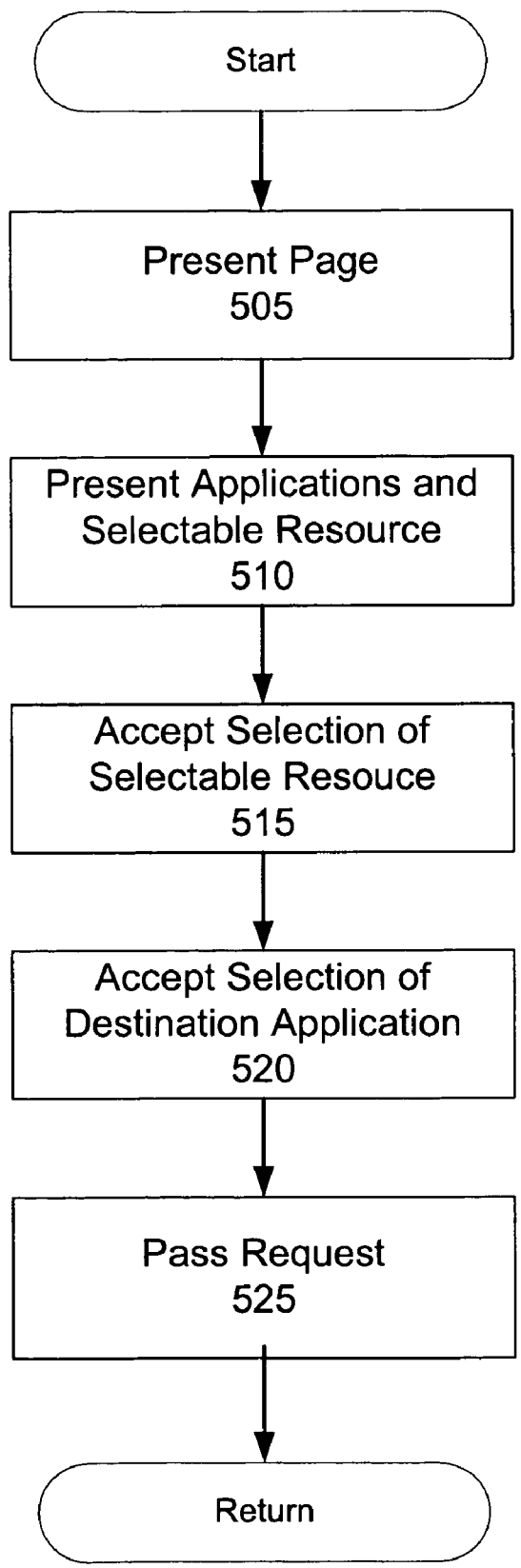
FIG. 5 is a flow chart illustrating one embodiment of a process of sharing resources between two applications.

FIG. 5 is a flow chart illustrating one embodiment of a process of sharing resources between two applications. In some embodiments, this process is performed by the client 130. In such embodiments, the process can be performed by a browser rendering a page displaying the applications.

In block (505) the page is presented. In some embodiments, presenting the page entails rendering a page that has been generated from a JSP by the server 120 and provided to the client 130. In block (510) the applications and selectable resource are presented. In some embodiments, the applications are portlets. In one embodiment an image is designated in the HTML for the page by the server, which selects the image according to a parameter in the JSP tag.

In block (515) the selection of the selectable resource is accepted. In one embodiment, the selection is made through the use of a pointing indicator like the one illustrated with respect to FIG. 3. In alternate embodiments, it can be selected through the use of a keyboard, voice commands, a touch screen, or any other interface mechanism.

In block (520) the selection of the destination application is accepted. In some embodiments, accepting the selection of a destination application entails dragging a representation of the resource over the drop zone for the destination application. In alternate embodiments the destination application can be selected through other mechanisms such as a single "click" with a mouse or pointing indictor.

In block (525) a request to associate the destination resource is passed to a resource association module. The resource association module can reside on either the client or the server.

Figure 6:
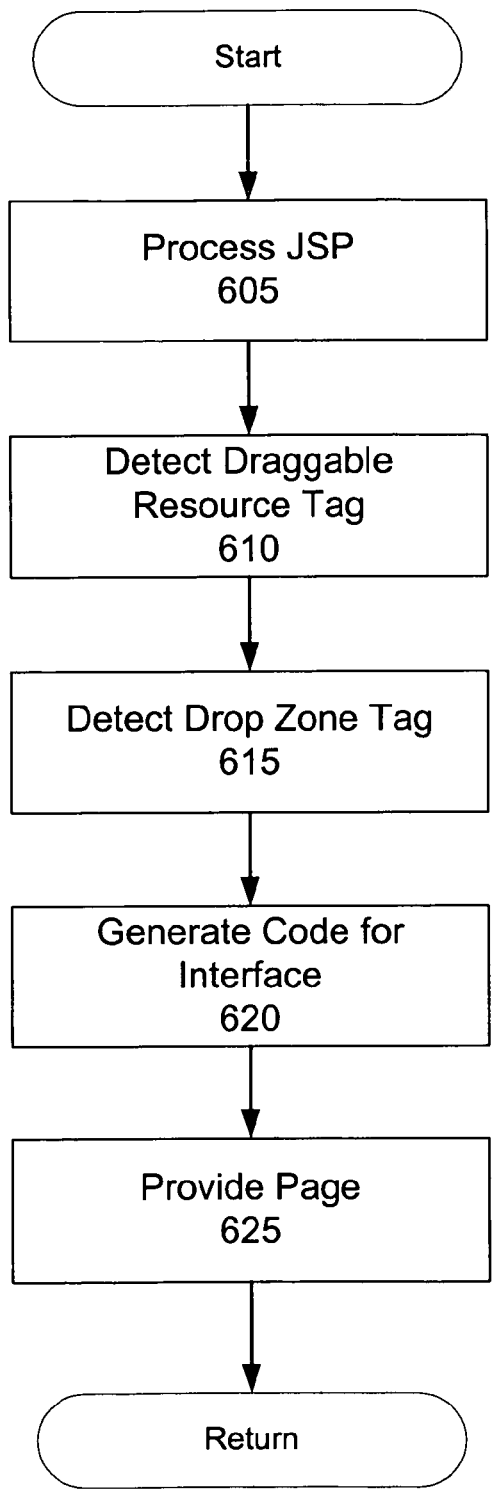
FIG. 6 illustrates one embodiment of a process for providing a page with resource sharing capabilities.

FIG. 6 illustrates one embodiment of a process for providing a page with resource sharing capabilities. In some embodiments, this process is performed by the server module 120. In block (605) the server processes a JSP. It should be understood that although in the current embodiment a JSP is used, in alternate embodiments other implementations can be utilized. In block (610) a draggable resource tag is detected. In some embodiments it has the following form:

```
<dragdrop:draggableResource imageId="testImage"
resourceId="${item.id}" resourceName="${item.name}">
    <img id="testImage" src="images/generic.gif" width="20"
height="22" border="0">
        <netui:anchor action="displayDetails">
            <netui:parameter name="issuesDetailsId" value="${id}"/>
            <b><c:out value="${item.name}"/></b>
        </netui:anchor>
</dragdrop:draggableResource>
```

In this embodiment, the parameters for the tag can be those discussed in the description of FIG. 2. In block (615) the server module 130 detects the drop zone tag in the page. In some embodiments it has the following form:

```
<dragdrop:resourceDropZone targetId="createNewDiscussion"
pageFlowAction="testAction">
    <netui:anchor action="createContent">Create New
    Discussion</netui:anchor><br>
</dragdrop:resourceDropZone>
```

In this embodiment, the parameters for the tag can be those discussed in the description of FIG. 2.

In block (620) the server utilizes the configuration information in the tags to generate code for an interface that allows association of resources with applications. In one embodiment, generating code for an interface entails generation of HTML for a page that can be presented on the client.

In block (625) the page is provided. In one embodiment providing the page entails transferring a page to the client for rendering and presentation.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for sharing resources among multiple applications, the method comprising:
    presenting a web page, the web page comprising
        a plurality of web applications, including a first web application and a second web application,
        a plurality of indicators, wherein each indicator
            identifies selectable resources in the web applications,
            identifies drop zones on the web page where a resource can be accepted, and
            indicates one or more functions to be performed on the resource when it is accepted;
        wherein the plurality of indicators include
            a first indicator that identifies a resource associated with the first web application, and
            a second indicator that identifies a drop zone associated with the second web application;
    accepting, by a draggable resource component, input indicating a selection of the resource associated with the first web application and the drop zone associated with the second web application; and
    in response to the selection
        providing, by the draggable resource component, the resource associated with the first web application to the second web application, and
        implementing on the second web application, by a resource acceptance module, the resource associated with the first web application wherein the implementation is particular to the second web application.

2. The method of claim 1, wherein presenting a web page comprising a plurality of indicators displayed thereon comprises:

generating a web page from Java Server Pages (JSP) tags, including generating the plurality of indicators based upon specific ones of JSP tags for the web page.

3. The method of claim 1, wherein accepting input indicating a selection of the first indicator and the second indicator comprises:
   accepting a selection indicated by a drag and drop operation.

4. The method of claim 1, wherein generating an association between the resource associated with the first application and the second application based upon the input comprises:
   generating code for an interface that enables association of the resource with the application.

5. The method of claim 4, wherein generating code for an interface that enables association of the resource with the application comprises:
   generating code based upon information associated with the first indicator and the second indicator as a JavaScript function.

6. The method of claim 1, wherein presenting a web page, the web page comprising a plurality of indicators displayed thereon comprises:
   displaying a graphical representation of the resource as the first indicator.

7. The method of claim 1, further comprising:
   providing, to a client, a page reflecting the association.

8. The method of claim 1, wherein the first application and second application comprise portlets.

9. A machine readable medium having instructions stored thereon that when executed by a processor cause a system to:
   present a web page, the web page comprising
      a plurality of web applications, including a first web application and a second web application,
      a plurality of indicators, wherein each indicator
         identifies selectable resources in the web applications,
         identifies drop zones on the web page where a resource can be accepted, and
         indicates one or more functions to be performed on the resource when it is accepted;
      wherein the plurality of indicators include
         a first indicator, that identifies a resource associated with the first web application, and
         a second indicator that identifies a drop zone associated with the second web application;
   accept, by a draggable resource component, input indicating a selection of the resource associated with the first web application and the drop zone associated with the second web application; and
   in response to the selection
      provide, by the draggable resource component, the resource associated with the first web application to the second web application, and
      implement on the second web application, by a resource acceptance module, the resource associated with the first web application wherein the implementation is particular to the second web application.

10. The machine readable medium of claim 9, wherein the instructions that when executed by a processor cause a system to present a web page comprising a plurality of indicators displayed thereon include instructions that cause the system to:
   generate a web page from Java Server Pages (JSP) tags, including generating the plurality of indicators based upon specific ones of JSP tags for the web page.

11. The machine readable medium of claim 9, wherein the instructions that when executed by a processor cause a system to accept input indicating a selection of the first indicator and the second indicator include instructions that cause the system to:
   accept a selection indicated by a drag and drop operation.

12. The machine readable medium of claim 9, wherein the instructions that when executed by a processor cause a system to generate an association between the resource associated with the first application and the second application based upon the input include instructions that cause the system to:
   generate code for an interface that enables association of the resource with the application.

13. The machine readable medium of claim 12, wherein the instructions that when executed by a processor cause a system to generate code for an interface that enables association of the resource with the application include instructions that cause the system to:
   generate code based upon information associated with the first indicator and the second indicator as a JavaScript function.

14. The machine readable medium of claim 9, wherein the instructions that when executed by a processor cause a system to present a web page, the web page comprising a plurality of indicators displayed thereon include instructions that cause the system to:
   display a graphical representation of the resource as the first indicator.

15. The machine readable medium of claim 9, further comprising instructions that cause the system to:
   provide, to a client, a page reflecting the association.

16. The machine readable medium of claim 9, wherein the first application and second application comprise portlets.

17. An apparatus for sharing resources among multiple applications, the apparatus comprising:
   a processor; and
   one or more stored sequences of instructions which, when executed by the processor, cause the processor to carry out the steps of
      presenting a web page, the web page comprising
         a plurality of web applications, including a first web application and a second web application,
         a plurality of indicators, wherein each indicator
            identifies selectable resources in the web applications,
            identifies drop zones on the web p age where a resource can be accepted, and
            indicates one or more functions to be performed on the resource when it is accepted;
         wherein the plurality of indicators include
            a first indicator that identifies a resource associated with the first web application, and
            a second indicator that identifies a drop zone associated with the second web application;
      accepting, by a draggable resource component, input indicating a selection of the resource associated with the first web application and the drop zone associated with the second web application; and
      in response to the selection
         providing, by the draggable resource component, the resource associated with the first web application to the second web application, and
         implementing on the second web application, by a resource acceptance module, the resource associated with the first web application wherein the implementation is particular to the second web application.

* * * * *

UNITED STATES PATENT AND TRADEMARK OFFICE
CERTIFICATE OF CORRECTION

| | | |
|---|---|---|
| PATENT NO. | : 7,716,687 B2 | Page 1 of 1 |
| APPLICATION NO. | : 11/170396 | |
| DATED | : May 11, 2010 | |
| INVENTOR(S) | : Christopher E. Bales et al. | |

It is certified that error appears in the above-identified patent and that said Letters Patent is hereby corrected as shown below:

In column 1, line 26, delete "et.," and insert -- et al., --, therefor.

In column 1, line 35-36, delete "providing collaboration" and insert -- sharing --, therefor.

In column 1, line 36, after "between" insert -- multiple --.

In column 9, line 41, in claim 9, delete "indicator," and insert -- indicator --, therefor.

In column 10, line 43, in claim 17, delete "p age" and insert -- page --, therefor.

Signed and Sealed this
Twelfth Day of July, 2011

David J. Kappos
*Director of the United States Patent and Trademark Office*